US012624666B2

(12) United States Patent
Izumi et al.

(10) Patent No.: US 12,624,666 B2
(45) Date of Patent: May 12, 2026

(54) POWER UNIT

(71) Applicant: KAWASAKI MOTORS, LTD., Hyogo (JP)

(72) Inventors: Kyohei Izumi, Hyogo (JP); Yuji Hida, Hyogo (JP); Jun Takagi, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 31 days.

(21) Appl. No.: 18/603,855

(22) Filed: Mar. 13, 2024

(65) Prior Publication Data

US 2024/0309819 A1     Sep. 19, 2024

(30) Foreign Application Priority Data

Mar. 14, 2023   (JP) ................................. 2023-039656
Nov. 24, 2023   (JP) ................................. 2023-199262

(51) Int. Cl.
*F02D 13/02*        (2006.01)
*B64D 27/08*        (2006.01)
(Continued)

(52) U.S. Cl.
CPC ......... *F02D 13/0203* (2013.01); *B64D 27/08* (2013.01); *B64D 33/02* (2013.01); (Continued)

(58) Field of Classification Search
CPC ......... F02B 61/04; F02B 67/00; F02B 75/20; F02B 2275/18; F02D 13/0203; (Continued)

(56) References Cited

U.S. PATENT DOCUMENTS 1,965,742 A * 7/1934 Junkers .................. B64D 35/00
464/24
2,248,334 A * 7/1941 Burke ..................... F02B 75/20
123/53.5
(Continued)

FOREIGN PATENT DOCUMENTS

CN        113266463 A * 6/2021 ............. B64U 50/13
CN        215256473 U * 12/2021
(Continued)

OTHER PUBLICATIONS

Rotax Aircraft Engines, Operators Manual for Rotax Engine Type 582 UL Series, Jan. 1, 2018, Edition 3/Rev. 0 (Year: 2018).*
(Continued)

*Primary Examiner* — John M Zaleskas
(74) *Attorney, Agent, or Firm* — Greenblum & Bernstein, P.L.C.

(57)                    ABSTRACT
A power unit includes an engine and a transmission mechanism, which is integrated with the engine, for transfer of power from the engine. The engine includes a crankshaft which converts a reciprocal motion of a piston to produce a rotary motion, a crankcase supporting the crankshaft, a cylinder extending from the crankcase so as to protrude in a reciprocating direction of the piston, and a cylinder head coupled to a protruding end of the cylinder. The transmission mechanism includes an output shaft arranged at one side of the crankshaft in an axial direction of the crankshaft to provide, as an output, rotational power from the crankshaft. The output shaft is positioned to a side of the crankshaft that faces the cylinder head with respect to the reciprocating direction and is positioned so as to overlap with the cylinder or the cylinder head when viewed in the axial direction.

16 Claims, 7 Drawing Sheets

(51) Int. Cl.

| | |
|---|---|
| *B64D 33/02* | (2006.01) |
| *B64D 33/04* | (2006.01) |
| *B64D 35/02* | (2024.01) |
| *F02B 61/04* | (2006.01) |
| *F02B 67/00* | (2006.01) |
| *F02B 75/20* | (2006.01) |
| *F16H 57/02* | (2012.01) |
| *F16H 57/021* | (2012.01) |

(52) U.S. Cl.

CPC ............. *B64D 33/04* (2013.01); *B64D 35/02* (2013.01); *F02B 61/04* (2013.01); *F02B 75/20* (2013.01); *F16H 57/021* (2013.01); *F02B 67/00* (2013.01); *F16H 2057/02043* (2013.01)

(58) Field of Classification Search

CPC ......... F16H 57/021; F16H 2057/02043; B64D 27/08; B64D 33/02; B64D 33/04; B64D 35/02

See application file for complete search history.

(56) References Cited

U.S. PATENT DOCUMENTS

| | | | | |
|---|---|---|---|---|
| 2,289,400 | A | * | 7/1942 | Woods .................... B64C 11/14 416/239 |
| 2,323,281 | A | * | 6/1943 | De Pew .................. F02B 75/20 244/53 R |
| 2,380,274 | A | * | 7/1945 | Trott ..................... B64D 27/04 416/500 |
| 2,442,838 | A | * | 6/1948 | Butterfield ............. B64D 35/04 74/411 |
| 3,431,882 | A | * | 3/1969 | Irgens .................... F02B 75/20 123/41.31 |
| 4,690,238 | A | * | 9/1987 | von Sivers ............... B60K 5/04 180/383 |
| 5,024,287 | A | | 6/1991 | Okui et al. |
| 5,050,701 | A | | 9/1991 | Okui et al. |
| 5,076,220 | A | * | 12/1991 | Evans .................... F02B 41/00 123/65 VC |
| 5,240,088 | A | | 8/1993 | Okui et al. |
| 5,257,674 | A | | 11/1993 | Okui et al. |
| 2002/0086595 | A1 | * | 7/2002 | Jordan .................. B63H 23/06 440/75 |

| | | | | |
|---|---|---|---|---|
| 2003/0015166 | A1 | | 1/2003 | Seymour |
| 2003/0089822 | A1 | * | 5/2003 | Koch .................... F16F 15/173 244/60 |
| 2003/0196845 | A1 | * | 10/2003 | Briggs, Jr. .............. F02B 75/20 180/337 |
| 2004/0187812 | A1 | * | 9/2004 | Czysz .................... F02B 61/02 123/59.6 |
| 2005/0132984 | A1 | * | 6/2005 | Fuerlinger ............ F16F 15/173 123/54.1 |
| 2006/0214054 | A1 | * | 9/2006 | Fuerlinger .............. F02B 61/04 244/57 |
| 2007/0068467 | A1 | * | 3/2007 | Stone ..................... F02B 61/04 123/44 C |
| 2008/0027620 | A1 | | 1/2008 | Feuerlinger et al. |
| 2010/0038473 | A1 | * | 2/2010 | Schneider ............ F16F 15/134 184/6.12 |
| 2013/0112158 | A1 | * | 5/2013 | Weinzierl .............. F02B 75/246 123/445 |
| 2015/0021112 | A1 | * | 1/2015 | Schmidt ............... B60K 17/356 180/243 |
| 2016/0102605 | A1 | | 4/2016 | Weinzierl et al. |
| 2017/0088283 | A1 | * | 3/2017 | Mittermaier ........... F16D 7/027 |
| 2018/0016021 | A1 | * | 1/2018 | Mittermaier ........... B64D 35/02 |
| 2024/0309799 | A1 | * | 9/2024 | Izumi ..................... F02P 15/02 |
| 2024/0309802 | A1 | * | 9/2024 | Izumi ..................... F02B 67/04 |

FOREIGN PATENT DOCUMENTS

| | | | | | |
|---|---|---|---|---|---|
| CN | 217841847 | U | * | 11/2022 | |
| CN | 217977012 | U | * | 12/2022 | |
| GB | 1210245 | A | * | 10/1970 | ........... F16F 15/264 |
| JP | 03-009027 | | | 1/1991 | |
| JP | 2003056356 | A | * | 2/2003 | ............. F02B 67/04 |
| JP | 2020041481 | A | * | 3/2020 | .......... H02K 7/1815 |

OTHER PUBLICATIONS

Hirth Engines, 35 Series, 3503, H35, <"https://hirthengines.com/wp-content/uploads/3503-brochure-soft-copy.pdf">, pp. 1-2, accessed via <"https://web.archive.org/web/20190819021908/https://hirthengines.com/wp-content/uploads/3503-brochure-soft-copy.pdf#expand"> as saved on Aug. 19, 2019, see p. 3 (Year: 2019).*

* cited by examiner

VD

PD

EXHAUST SIDE
(OTHER END SIDE)

AIR INTAKE SIDE
(ONE END SIDE)

ONE DIRECTION SIDE

OTHER DIRECTION SIDE

ONE DIRECTION SIDE

OTHER DIRECTION SIDE

ONE DIRECTION SIDE →

OTHER DIRECTION SIDE →

ONE DIRECTION SIDE      WD      OTHER DIRECTION SIDE

POWER UNIT

CROSS REFERENCE TO THE RELATED APPLICATION

This application is based on and claims Convention priority to Japanese patent applications No. 2023-039656, filed Mar. 14, 2023 and No. 2023-199262, filed Nov. 24, 2023, the entire disclosures of which are herein incorporated by reference as a part of this application.

BACKGROUND OF THE INVENTION

Field of the Invention

The present disclosure relates to a power unit including an engine and a transmission mechanism, which is integrated with the engine, for transfer of power from the engine.

Description of Related Art

Some vehicles employ, as a power source therefor, a power unit including an engine and a transmission mechanism, which is integrated with the engine, for transfer of power from the engine (for example, JP H03-009027 A). A principal shaft of the transmission mechanism in this power unit is coupled to, for example, a propeller, an impeller, or a wheel.

Reduction in size is crucial for a power unit like the one in JP H03-009027 A because it involves integration of the transmission mechanism into the engine.

SUMMARY OF THE INVENTION

The present disclosure provides a power unit with a reduced size.

A power unit, according to a first aspect of the present disclosure, comprises an engine and a transmission mechanism which is integrated with the engine for transfer of power from the engine. The engine includes a piston, a crankshaft which converts a reciprocal motion of the piston to produce a rotary motion, a crankcase supporting the crankshaft, a cylinder extending from the crankcase so as to protrude in a reciprocating direction of the piston, and a cylinder head coupled to a protruding end of the cylinder. The transmission mechanism includes an output shaft arranged at one side of the crankshaft in an axial direction of the crankshaft to provide, as an output, rotational power from the crankshaft. The output shaft is positioned to a side of the crankshaft that faces the cylinder head with respect to the reciprocating direction of the piston and is positioned so as to overlap with the cylinder or the cylinder head when viewed in the axial direction of the crankshaft.

A power unit according to the present disclosure can minimize protrusion of a transmission mechanism and an output shaft thereof from an engine in a direction which is perpendicular to both an axial direction of a crankshaft and a reciprocating direction for a piston. As a result, a power unit having a reduced size can be provided for.

Any combinations of at least two features disclosed in the claims and/or the specification and/or the drawings should also be construed as encompassed by the present disclosure. Especially, any combinations of two or more of the claims should also be construed as encompassed by the present disclosure.

BRIEF DESCRIPTION OF THE DRAWINGS

The present disclosure will be more clearly understood from the following description of preferred embodiments made by referring to the accompanying drawings. However, the embodiments and the drawings are given merely for the purpose of illustration and explanation, and should not be used to delimit the scope of the present disclosure, which scope is to be delimited by the appended claims. In the accompanying drawings, alike numerals are assigned to and indicate alike parts throughout the different figures, and:

DESCRIPTION OF EMBODIMENTS

Figure 1:
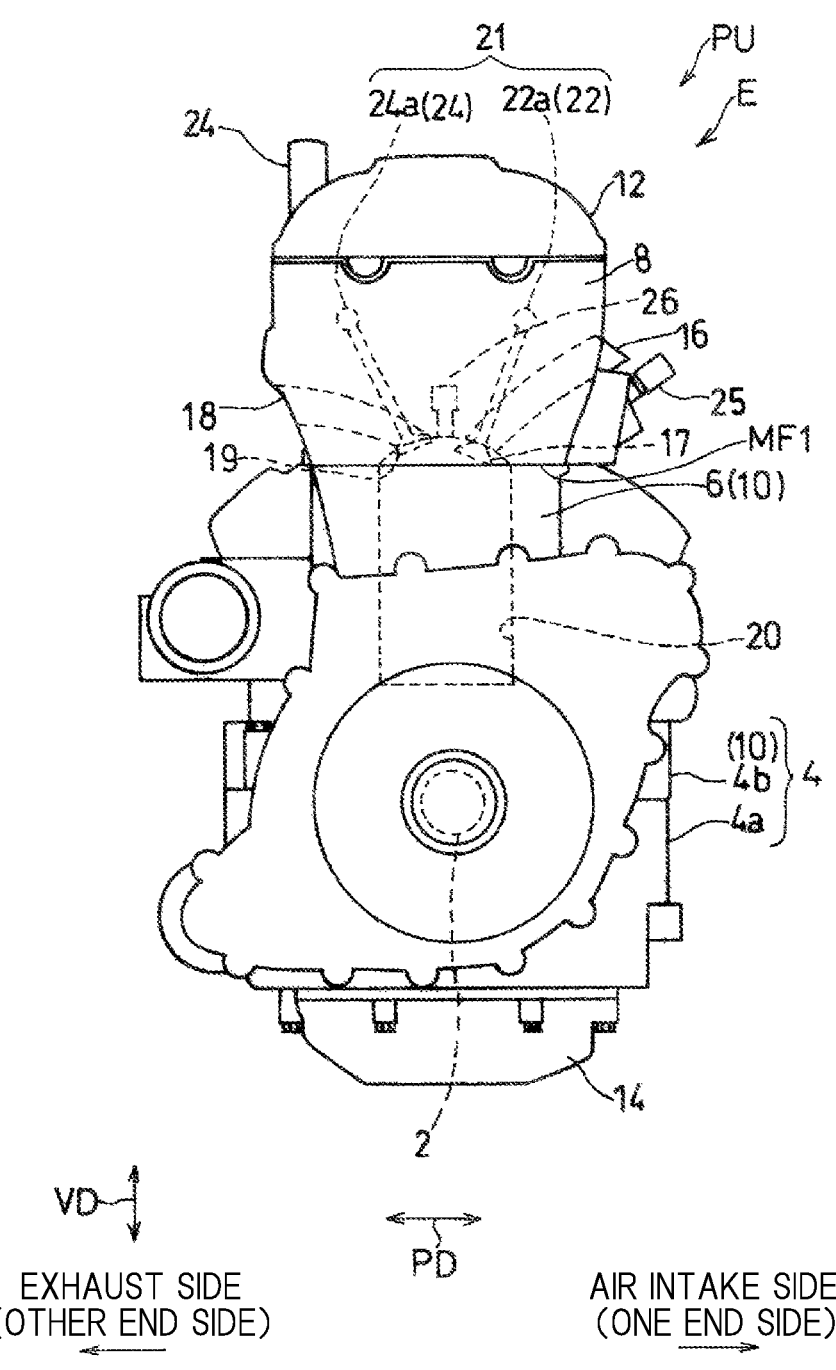
FIG. 1 shows a side view of the right of a power unit in accordance with a first embodiment of the present disclosure.

What follows is a description of preferred embodiments of the present disclosure made with reference to FIGS. 1 to 7. An engine E in the instant embodiment is a reciprocating engine and is used, for example, in an aircraft having a fuselage and a propeller disposed on a leading end of the fuselage. The engine E in this case is received within the fuselage and produces power to be transferred to the propeller. This is merely one of the non-limiting examples of the use of the engine E; for instance, the engine E can also be used as a power source for a ship. The engine E can also be used as a power source for wheeled vehicles including two-wheeled and four-wheeled vehicles.

In the discussions that follow, the term "widthwise direction WD" refers to a direction in or along which a crankshaft 2 of the engine E extends. Thus, the widthwise direction WD coincides with an "axial direction of a crankshaft." With respect to the widthwise direction WD, a "widthwise inside" refers to a side facing towards a center of the engine E in the widthwise direction, whereas a "widthwise outside" refers to a side facing away from the center of the engine E in the widthwise direction. The term "reciprocating direction VD" refers to a direction in or along which pistons of the engine E reciprocate. The term "perpendicular direction PD" refers to a direction perpendicular to both the "widthwise direction WD" and the "reciprocating direction VD."

The engine E in the instant embodiment is a six-cylinder engine having six cylinders arranged along a direction in which the crankshaft 2 extends. It should be understood that the number of the cylinders is not so limited; for example, the number of the cylinders may be four. Further, while the engine E in the instant embodiment is a gasoline engine, gasoline is only one of the non-limiting examples of fuel. The crankshaft 2 converts reciprocal motions of the pistons 3 to produce a rotary motion.

The engine E includes: a crankcase 4 supporting the crankshaft 2, the cylinders 6 extending from the crankcase 4 so as to protrude in an upper direction, and a cylinder head 8 coupled to upper ends of the cylinders 6. In the discussions that follow, with respect to the reciprocating direction VD of the pistons 3, the terms "upper" and "upward" refer to a side on which the cylinders 6 protrude from the crankcase 4, whereas the terms "lower" and "downward" refer to an opposite side thereto.

The crankcase 4 is formed of two upper and lower sub-parts including a lower crankcase 4a and an upper crankcase 4*b*. In the instant embodiment, the upper crank-case 4*b* and the cylinders 6 are formed as one piece by being cast in a die. However, the upper crankcase 4*b* and the cylinders 6 may alternatively be independent units. In the discussions that follow, the one-piece unit including the upper crankcase 4*b* and the cylinders 6 will be referred to as a cylinder block 10.

The engine E also includes a head cover 12 coupled to an upper end of the cylinder head 8 and an oil pan 14 coupled to a lower end of the crankcase 4. The cylinder head 8 and the cylinder head cover 12 define a cam chamber. The oil pan 14 serves as a reservoir of oil which represents an engine lubricant fluid.

The cylinder head 8 has an air intake port 16 and an exhaust port 18 which are open to one end side (i.e., the right side of FIG. 1) and the other end side (i.e., the left side of FIG. 1), respectively, of the cylinder head 8 in the perpendicular direction PD. In the discussions that follow, the terms "air intake side" and "exhaust side" refer to a side of the engine E where the air intake port is located and a side of the engine E where the exhaust port is located in the perpendicular direction PD, respectively.

The air intake port 16 and the exhaust port 18 represent passages defined inside the cylinder head 8. An upstream end of the air intake port 16 is open to the one end side of the cylinder head 8 in the perpendicular direction PD, whereas a downstream end of the air intake port 16 is open to a corresponding one of combustion chambers 20 within the cylinders 6. An upstream end of the exhaust port 18 is open to a corresponding one of the combustion chambers 20 within the cylinders 6, whereas a downstream end of the exhaust port 18 is open to the other end side of the cylinder head 8 in the perpendicular direction PD. The air intake port 16 is formed for each of the cylinders. Likewise, the exhaust port 18 is formed for each of the cylinders.

The engine E in the instant embodiment includes an air intake valve 17 which opens and closes a corresponding air intake port 16 and an exhaust valve 19 which opens and closes a corresponding exhaust port 18. A valve operation control mechanism 21 opens and closes the air intake valve 17 and the exhaust valve 19. In the instant embodiment, there are two air intake valves 17 and two exhaust valves 19 for each of the cylinders.

The valve operation control mechanism 21 opens and closes the air intake valve 17 and the exhaust valve 19 in a synchronous manner with the rotary motion of the crankshaft 2. In the instant embodiment, the valve operation control mechanism 21 comprises an air intake valve operation control mechanism 22 and an exhaust valve operation control mechanism 24 that operate independently on the air intake side and the exhaust side. The air intake valve operation control mechanism 22 includes an air intake-side cam shaft 22*a* and cams provided on the air intake-side cam shaft 22*a* to open and close corresponding air intake valves 17. The exhaust valve operation control mechanism 24 includes an exhaust-side cam shaft 24*a* and cams provided on the exhaust-side cam shaft 24*a* to open and close corresponding exhaust valves 19.

Figure 3:
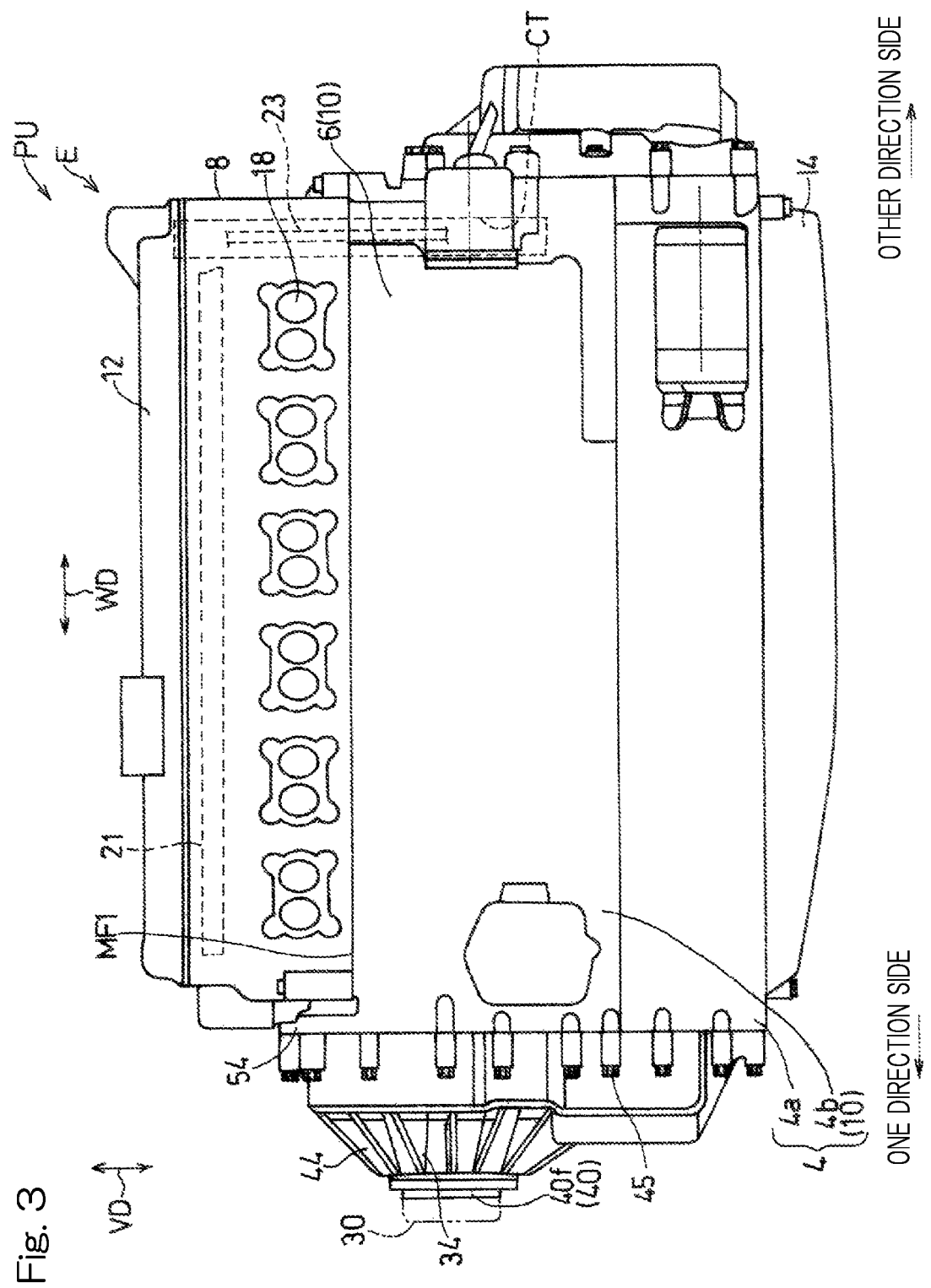
FIG. 3 shows a front elevational view of the power unit.

Turning to FIG. 3, the valve operation control mechanism 21 of the engine E includes a power transmission member 23 which transfers the rotary motion of the crankshaft 2. The power transmission member 23 in the instant embodiment comprises a cam chain. It should be understood that a cam chain is only one of the non-limiting examples of the power transmission member 23; for example, the power transmission member 23 can comprise a drive shaft.

The power transmission member 23 (or the cam chain) is disposed in a transmission member housing space CT. The transmission member housing space CT in the instant embodiment comprises a cam chain tunnel CT in which the cam chain 23 is housed. The cam chain tunnel CT is defined by the cylinders 6 and the cylinder head 8 and extends in the reciprocating direction VD. In the instant embodiment, the cam chain tunnel CT is located at one of the opposite ends of the engine E in the widthwise direction WD of the engine E.

Turning to FIG. 1, ambient air is delivered via the air intake port 16 as intake air to a corresponding combustion chamber 20. Concurrently, the fuel is injected by an injector 25 into the corresponding combustion chamber 20, thereby forming an air-fuel mixture. The air-fuel mixture in the corresponding combustion chamber 20 is ignited by an ignition plug 26 for combustion. Exhaust gas from the combustion chamber 20 is discharged out of the engine E via the exhaust port 18.

Figure 5:
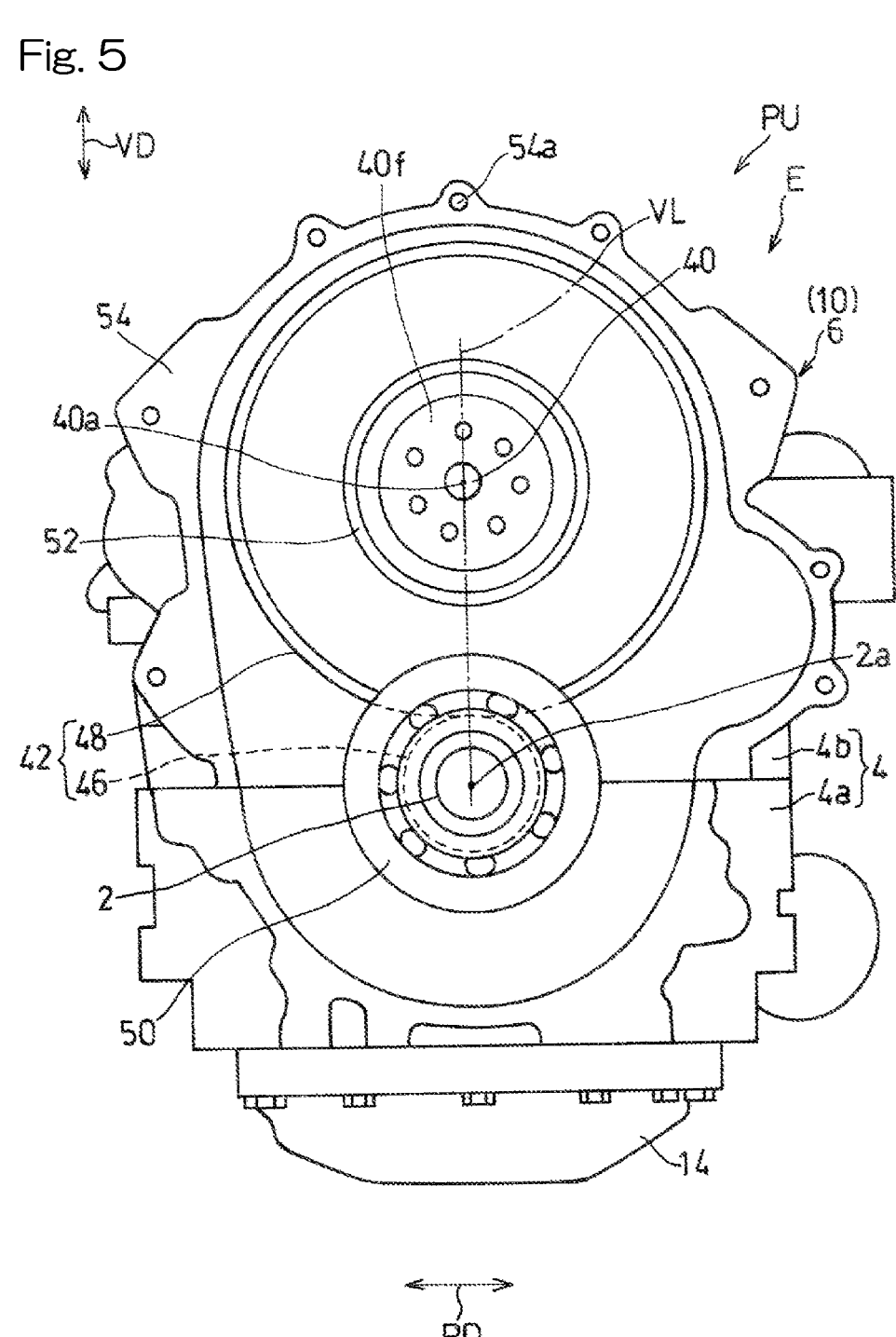
FIG. 5 shows a side view of the left of the power unit with a gear cover removed.

Turning to FIG. 5, an engine E according to the present disclosure represented by a power unit PU which includes an engine body and a transmission mechanism 42, that is integrated with the engine body, for transfer of power from the engine E. More specifically, the transmission mechanism 42 is accommodated in the engine body. The engine body comprises the crankcase 4 and the cylinder block 6.

The transmission mechanism 42 includes an output shaft 40 which provides, as an output, rotational power from the crankshaft 2. The transmission mechanism 42 transfers power from the engine E to the output shaft 40 with a changed speed. In particular, the transmission mechanism 42 in the instant embodiment comprises a speed reducer 42 which reduces a speed of power from the engine E. Accordingly, rotational power from the crankshaft 2 is transferred to the output shaft 42 with a reduced speed through the speed reducer 42. In this way, a change in speed at a gear ratio that suits a desired output can be achieved.

Figure 4:
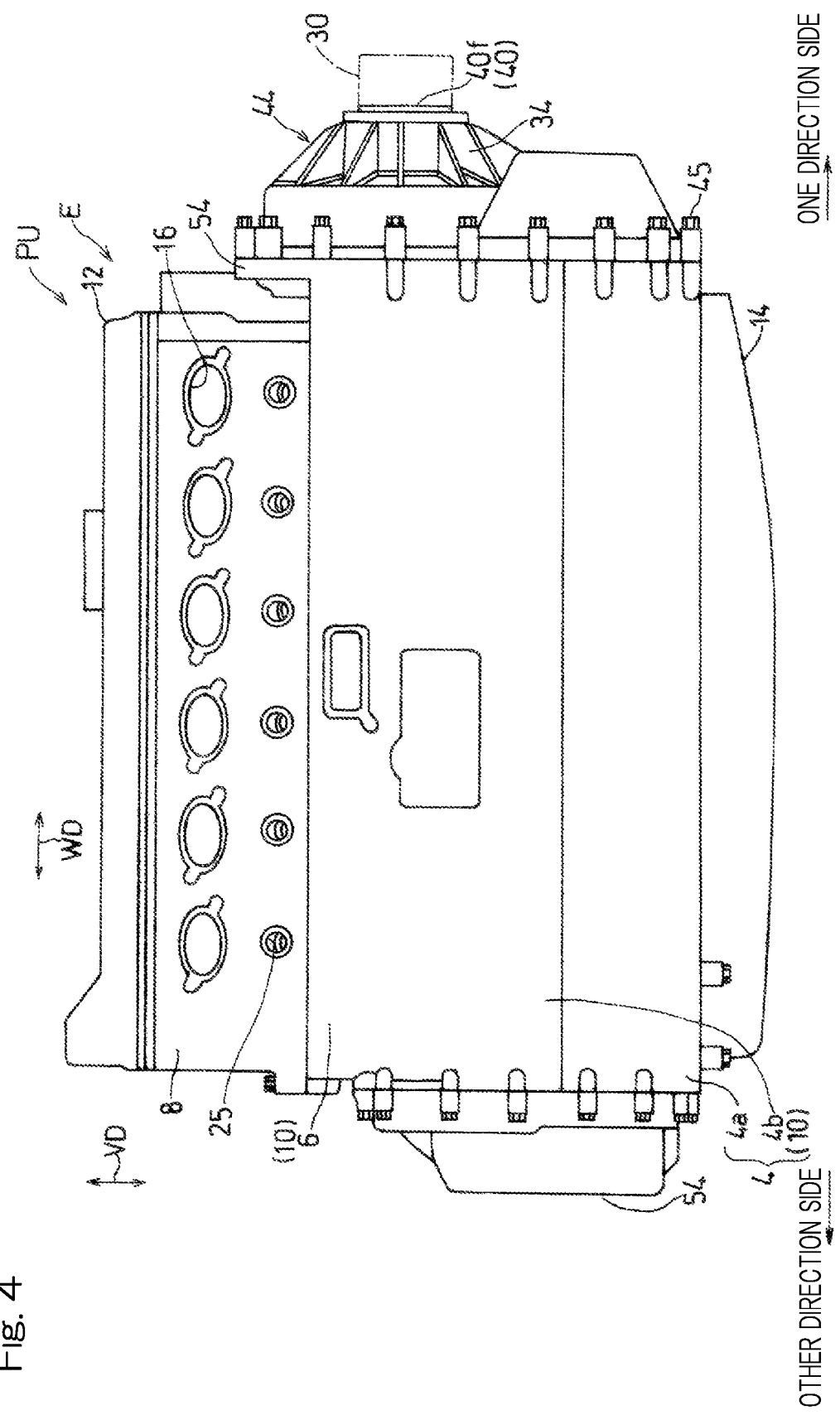
FIG. 4 shows a rear view of the power unit.

Turning to FIG. 4, the output shaft 40 couples to a rotary element 30 either directly or via one or more power transmission components. In the instant embodiment, the output shaft 40 coaxially couples to the rotary element 30. Examples of the rotary element 30 include a propeller of an aircraft, a wheel of a wheeled vehicle, a rotor of a turbine or compressor, and an impeller of a pump.

For instance, in the instant embodiment, a propeller of an aircraft is used as the rotary element 30 for the power unit PU that is disposed in an airframe of the propeller aircraft. In this case, the crankshaft 2 can be disposed along with a propeller shaft in a direction aligned with a centerline of the airframe, with the centerline extending in a longitudinal direction of the fuselage of the propeller aircraft. Further, the reciprocating direction VD of the pistons 3 can be aligned with a vertical direction, with wings of the aircraft being positioned on the horizontal. Furthermore, an axis defined by the cylinders 6 can be located on the centerline of the airframe. This allows the power unit PU to be received within the fuselage in a compact manner.

The output shaft 40 and the speed reducer 42 are located at one of the opposite ends of the engine E in the widthwise direction WD of the engine E. In the instant embodiment, the output shaft 40 and the speed reducer 42 are located at one end of the engine E that is opposite to the cam chain tunnel CT in the widthwise direction WD.

In the discussions that follow, one side of the engine E in the widthwise direction WD of the engine E refers to a side of the engine E in the widthwise direction WD where the output shaft 40 is located, whereas the other side of the engine E in the widthwise direction WD of the engine E refers to a side of the engine E in the widthwise direction WD where the cam chain tunnel CT is located.

The output shaft 40 and the speed reducer 42 of the engine E will be discussed in detail.

As illustrated in FIG. 5, the output shaft 40 of the speed reducer 42 extends parallel to the crankshaft 2 and is positioned to a side of the crankshaft 2 that faces the cylinder head 8 with respect to the reciprocating direction VD. Further, the output shaft 40 of the speed reducer 42 is positioned so as to overlap with the cylinders 6 or the cylinder head 8 when viewed in the axial direction of the crankshaft 2 or in the widthwise direction WD.

Figure 2:
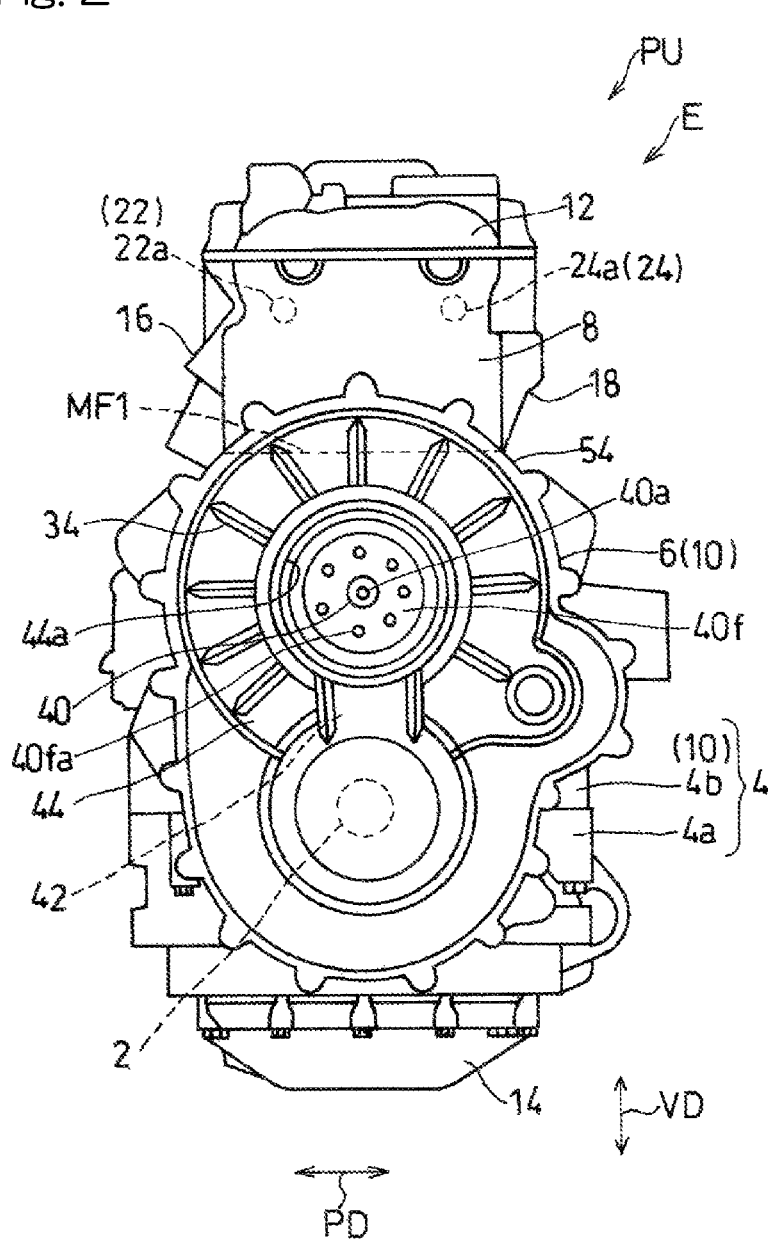
FIG. 2 shows a side view of the left of the power unit.

As illustrated in FIG. 2, the output shaft 40 is positioned to be situated within a dimension defined by the cylinders 6 in the perpendicular direction PD. In the instant embodiment, the output shaft 40 is positioned so as to overlap with cylinder chambers when viewed in the widthwise direction WD. More specifically, the output shaft 40 defines a center axis 40a which is situated intermediate between the air intake-side cam shaft 22a and the exhaust-side cam shaft 24a in the perpendicular direction PD. Preferably, at least a portion of the output shaft 40 is situated centrally within the dimension defined by the cylinders 6 in the perpendicular direction PD. In the instant embodiment, the center axis 40a of the output shaft 40 is situated centrally within the dimension defined by the cylinders 6 in the perpendicular direction PD.

In this way, the output shaft 40 can be positioned closer to a center of gravity of the cylinders 6 in the perpendicular direction PD, thus, helping the output shaft 40 be arranged closer to a center of gravity of the engine E. Further, protrusion of the speed reducer 42 on one or both sides thereof in the perpendicular direction PD can be kept to a minimum.

Figure 7:
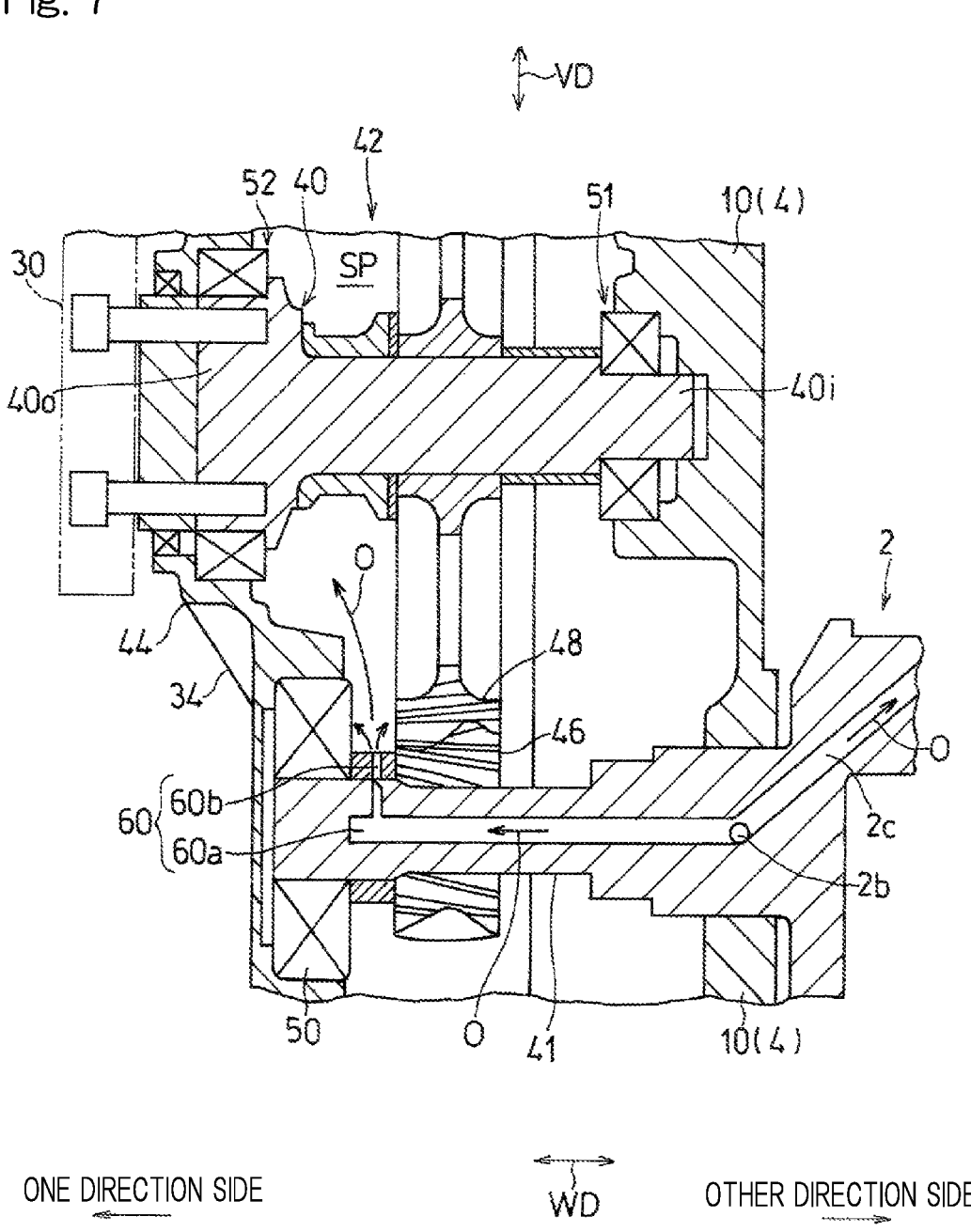
FIG. 7 shows a cross-sectional view of the power unit, illustrating a crankshaft and a transmission mechanism.

As illustrated in FIG. 7, the speed reducer 42 in the instant embodiment includes an input-side gear 46 provided on the crankshaft 2 and an output-side gear 48 provided on the output shaft 40 with the gears 46, 48 in mesh with each other. Accordingly, the input-side gear 46, the output shaft 40, and the output-side gear 48 form a power transmission rotational member which rotates in an interlocking manner with the crankshaft 2. In the instant embodiment, the input-side and the output-side gears 46, 48 comprise helical gears. Helical gears are advantageous in terms of strength and noise. It should be understood that a helical gear pair is only one of the non-limiting examples of the speed reducer 42.

Figure 6:
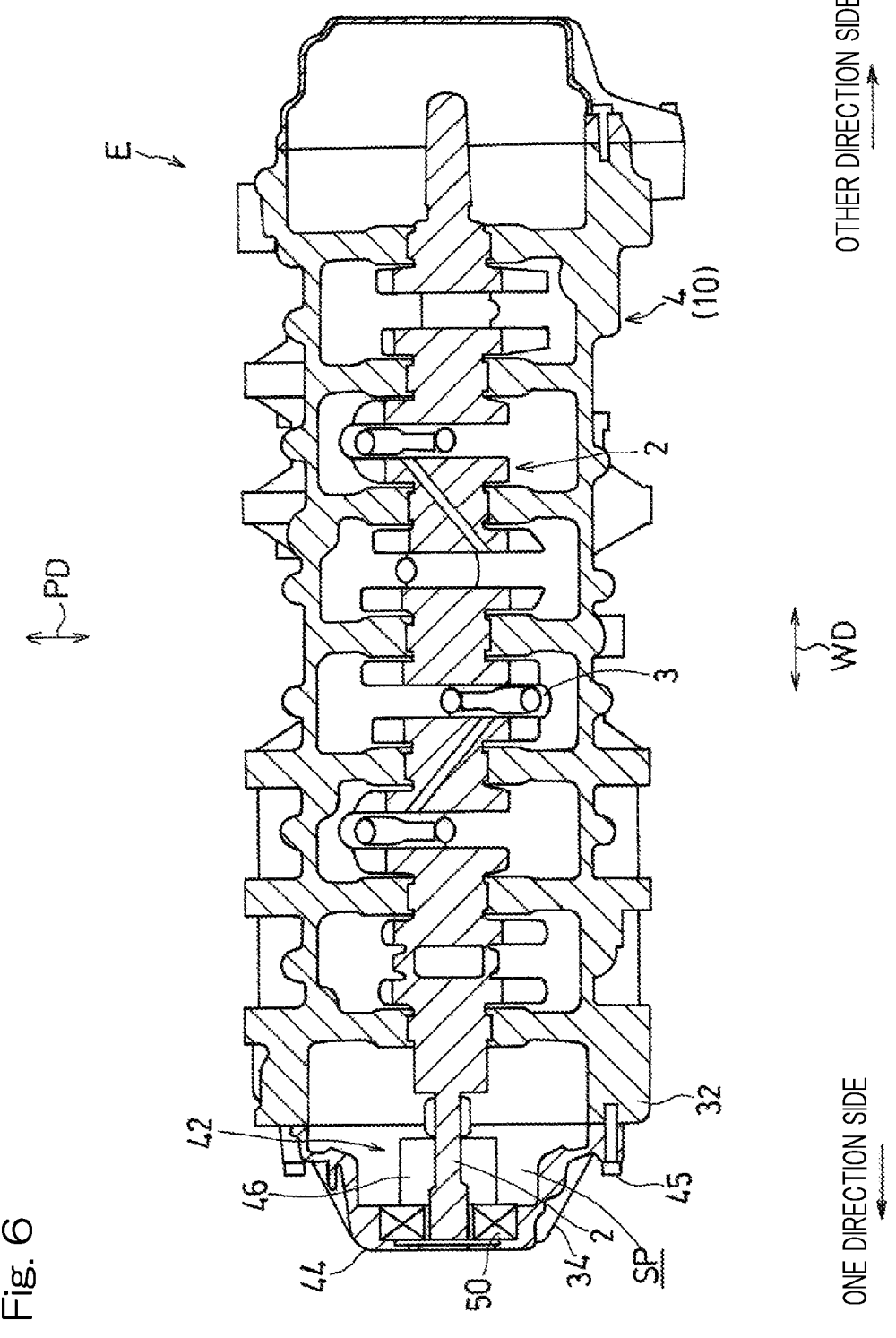
FIG. 6 shows a horizontal cross-sectional view of the power unit.

As illustrated in FIG. 6, a gear housing space SP for the speed reducer 42 is defined in the cylinder block 10 of the engine E. In other words, a gear casing 32 that defines the gear housing space SP is constructed as one piece with the cylinder block 10 of the engine E. Accordingly, the gear casing 32 forms a casing enclosing the power transmission rotational member 40, 46, 48.

The gear housing space SP is covered by a gear casing cover 44 in a circumferential direction and from a widthwise outside (or in the axial direction). As illustrated in FIG. 3, the gear casing cover 44 is coupled to the cylinder block 10 at one of the opposite ends thereof in the widthwise direction WD. The gear casing 44 is fitted onto the cylinder block 10 with a plurality of fasteners 45 such as bolts. The gear casing cover 44 is fixed to the gear casing 32 of the cylinder block 10 to define the gear housing space SP. Accordingly, the gear casing cover 44 also forms the casing enclosing the power transmission rotational member 40, 46, 48.

As illustrated in FIG. 2, the gear casing cover 44 is formed therein with an output shaft opening 44a that faces a widthwise outside thereof. The output shaft 40 protrudes from the output shaft opening 44a. The output shaft 40 has a flange 40f formed on one of the axial ends thereof. In other words, the output shaft 40 is formed to have a radial dimension which is enlarged, at one of the axial ends thereof, relative to the rest of the output shaft 40. The flange 40f has bolt holes 40fa provided therein via which to couple to the rotary element 30.

In the illustration of FIG. 5, the gear casing cover 44 is removed. FIG. 5 shows the engine E in the instant embodiment which is installed in a vehicle in an upright position, that is, in such a position that axes of the pistons are aligned with the vertical direction VD and that the output shaft 40 is positioned right above the crankshaft 2. More specifically, the center axis 40a of the output shaft 40 and a center axis 2a of the crankshaft 2 are aligned on a vertical axis VL.

By orienting the engine E in an upright position, the engine E can be kept in a better balance along the perpendicular direction PD. It also results in less constraints on the layout of air intake and exhaust systems and enhances freedom of design, as compared to when the engine is installed with the axes of the pistons inclined relative to the vertical direction VD. The positioning of the output shaft 40 right above the crankshaft 2 can assist in taking out of power from the engine E at a portion of the engine E which is closer to the center of gravity of the engine E.

Furthermore, the alignment of the crankshaft 2 and the output shaft 40 on the vertical axis VL in combination with the installment of the engine E in an upright position helps reduce the size of the engine E in the perpendicular direction PD. It should be understood that the center axis 40a of the output shaft 40 and the center axis 2a of the crankshaft 2 do not necessarily have to be aligned on the vertical axis VL; for example, they may be slightly offset from each other.

The speed reducer 42 is located between the crankshaft 2 and the output shaft 40 in the vertical direction VD. That is, the input-side gear 46 and the output-side gear 48 mesh each other at a meshing site which is located above the crankshaft 2 and below the output shaft 40. More specifically, the input-side gear 46 and the output-side gear 48 mesh each other at a meshing site which is located on the vertical axis VL connecting the center axis 2a of the crankshaft 2 and the center axis 40a of the output shaft 40.

As illustrated in FIG. 6, the crankshaft 2 is supported by the crankcase 4 and the gear casing cover 44. More specifically, the crankshaft 2 is supported by the gear casing cover 44 through a first bearing 50 at one of the opposite ends of the crankshaft 2 on one side thereof in the widthwise direction WD and is rotatably supported by the crankcase 4 on the other side thereof in the widthwise direction WD. In the instant embodiment, the crankshaft 2 is supported by a rolling contact bearing (i.e., the first bearing 50) at one of the opposite ends of the crankshaft 2 on the one side thereof in the widthwise direction WD. It should be noted that a rolling contact bearing is only one of the non-limiting examples of the first bearing 50.

As illustrated in FIG. 7, the output shaft 40 of the speed reducer 42 is supported by the cylinder block 10 and the gear casing cover 44. More specifically, the output shaft 40 is supported by the cylinder block 10 through a second bearing 51 at one of the opposite ends of the output shaft 40 on the other side thereof in the widthwise direction WD (or at a widthwise inside end 40i of the output shaft 40) and is supported by the gear casing cover 44 through a third bearing 52 at the other of the opposite ends of the output shaft 40 on one side thereof in the widthwise direction WD (or at a widthwise outside end 400 of the output shaft 40). By way of example, the second and third bearings 51, 52 are rolling contact bearings.

As illustrated in FIG. 2, the gear casing cover 44 includes a rib 34 provided thereon. The rib 34 is provided on an outer surface of the gear casing cover 44. In the instant embodiment, the rib 34 extends in a radial direction of the output shaft 40 and comprises a plurality of ribs spaced apart in a circumferential direction of the output shaft 40. The provision of the rib 34 reinforces a bearing site at the gear casing cover 44. This allows the material thickness of the gear casing cover 44 to be thinned while at the same time achieving an improved rigidity with which to support the output shaft 40.

As illustrated in FIG. 5, the cylinder block 10 is provided with a casing mount 54 on which to mount the gear casing cover 44 in place. The casing mount 54 is formed therein with threaded holes 54*a* into which the fasteners 45 (FIG. 4) are screwed.

A portion (i.e., an upper portion in FIG. 5) of the casing mount 54 protrudes towards the cylinder head 8 (i.e., upwards in FIG. 5) in the reciprocating direction VD of the pistons 3 beyond a mating interface MF1 between the cylinders 6 and the cylinder head 8. In other words, an upper portion of the casing mount 54 protrudes upwards beyond a lower surface of the cylinder head 8. This allows the output-side gear 48 with a large diameter to be disposed in place, and also, allows the output shaft 40 to be positioned at a high height without increasing the size of the engine E, even when the engine E is intended to be installed in an upright position with the crankshaft 2 and the output shaft 40 aligned on the vertical axis VL.

In the instant embodiment, as illustrated in FIG. 7, the crankshaft 2 and the input-side gear 46 have a feed channel 60 defined therein for a lubricant fluid O. The feed channel 60 internally delivers the lubricant fluid O to the input-side gear 46 and the output-side gear 48. The feed channel 60 in the instant embodiment includes a first passage 60*a* defined inside the crankshaft 2 and a second passage 60*b* defined in the input-side gear 46.

The first passage 60*a* extends in an axial direction inside the crankshaft 2. The crankshaft 2 is formed to have a lubricant fluid entrance 2*b*. A portion of the lubricant fluid O introduced via the entrance 2*b* is delivered into the first passage 60*a* while the rest of the lubricant fluid O is delivered into a connecting rod lubrication channel 2*c*. The first passage 60*a*, at one end side thereof in the widthwise direction WD, extends radially outwards to communicate with the second passage 60*b* in the input-side gear 46.

The second passage 60*b* extends in a radial direction to communicate, at a radially inner end thereof, with the first passage 60*a* in the crankshaft 2 and to open, at a radially outer end thereof, to the gear housing space SP. The lubricant fluid O delivered into the second passage 60*b* via the first passage 60*a* in the crankshaft 2 is ejected through a radially outer opening of the second passage 60*b* to lubricate toothed surfaces of the input-side gear 46 and the output-side gear 48 and the bearings 50, 51, 52.

According to the configuration described thus far, as illustrated in FIG. 2, the output shaft 40 is positioned to a side of the crankshaft 2 that faces the cylinder head 8 with respect to the reciprocating direction VD of the pistons 3 and is positioned so as to overlap with the cylinders 6 or the cylinder head 8 when viewed in the axial direction of the crankshaft 2. This can minimize protrusion of the speed reducer 42 and the output shaft 40 thereof from the engine E in the perpendicular direction PD. As a result, a power unit PU having a reduced size can be provided for.

In the instant embodiment, the output shaft 40 is positioned to be situated within a dimension defined by the cylinders 6 in the perpendicular direction PD. This configuration can minimize protrusion of the speed reducer 42 and the output shaft 40 thereof relative to the engine E in the perpendicular direction PD and can thereby provide for a power unit PU having a reduced size.

In the instant embodiment, the output shaft 40*a* defines an axis 40*a* which is situated intermediate between the air intake-side cam shaft 22*a* and the exhaust-side cam shaft 24*a* in the perpendicular direction PD. Also, a portion of the output shaft 40 is situated centrally within the dimension defined by the cylinders 6 in the perpendicular direction PD. In the instant embodiment, the center axis 40*a* of the output shaft 40 is situated centrally within the dimension defined by the cylinders 6 in the perpendicular direction PD. According to this configuration, the output shaft 40 can be positioned closer to a center of gravity of the cylinders 6 in the perpendicular direction PD. In other words, the positioning of the output shaft 40 closer to the center of gravity of the engine E is facilitated. Further, protrusion of the speed reducer 42 from the engine body in the perpendicular direction PD can be kept to a minimum.

In the instant embodiment, as illustrated in FIG. 6, the second and third bearings 51, 52 rotatably supporting the power transmission rotational member 48 are respectively provided on the side of the gear casing cover 44 and on the side of the engine block 10. According to this configuration, the power transmission rotational member 48 is supported on both ends to allow for secure rotational support of the same.

In the instant embodiment, as illustrated in FIG. 2, the gear casing cover 44 includes the rib 34 formed thereon. The rib 34 extends in a radial direction of the output shaft 40 and comprises a plurality of ribs spaced apart in a circumferential direction of the output shaft 40. According to this configuration, the rib 34 reinforces a bearing site at the gear casing cover 44. As a result, the material thickness of the gear casing cover 44 can be thinned while at the same time achieving an improved support rigidity of the gear casing cover 44.

In the instant embodiment, as illustrated in FIG. 7, the crankshaft 2 has the feed channel 60 defined therein to deliver the lubricant fluid O to the power transmission rotational member 46, 48. According to this configuration, the lubricant fluid entrance 2*b* in the crankshaft 2 is used from which to deliver the lubricant fluid O to the feed channel 60. It can thereby eliminate the need to provide a lubrication channel in or at the gear casing cover 44.

In the instant embodiment, as illustrated in FIG. 2, a portion (or an upper portion) of the casing mount 54 on the cylinders 6 protrudes towards the cylinder head 8 (or upwards) in the reciprocating direction VD of the pistons beyond the mating interface MF1 between the cylinders 6 and the cylinder head 8. This configuration helps bring the output shaft 40 closer to the center of gravity of the engine E.

In the instant embodiment, as illustrated in FIG. 3, the output shaft 40 coaxially couples to the rotary element 30. According to this configuration, an axis of the rotary element 30 can be arranged closer to the center of gravity of the engine E, thereby allowing a reduction to be achieved in the size of a device to which the power unit PU is intended to be installed.

The above described configurations are only some of the non-limiting configurations of the present disclosure. Numerous additions, modifications, or omissions can be made therein without departing from the principle of the present disclosure. By way of example, the power unit PU in the embodiment described thus far can also be applied to saddle-riding vehicles including motorcycles, three-wheeled vehicles, and four-wheel buggies (or all-terrain vehicles). The power unit PU may be used in outboard motors or used as a propulsion source for an aircraft. In addition, the power unit PU may be used as a propulsion source for four-wheeled vehicles and small planing boats. The number of the cylinders does not necessarily have to be six and may, instead, be less than six or more than six. The power unit PU may be provided with a turbocharger, a supercharger, or other similar device(s). Thus, such variants are also encompassed within the scope of the present disclosure.

What is claimed is:

1. A power unit comprising:

an engine including a piston, a crankshaft which converts a reciprocal motion of the piston to produce a rotary motion, a crankcase supporting the crankshaft, a cylinder extending from the crankcase so as to protrude in a reciprocating direction of the piston, and a cylinder head coupled to a protruding end of the cylinder;

a transmission mechanism integrated with the engine for transfer of power from the engine, the transmission mechanism including an output shaft arranged at one side of the crankshaft in an axial direction of the crankshaft to provide, as an output, rotational power from the crankshaft; and a gear casing cover coupled to the cylinder at one end portion thereof in the axial direction of the crankshaft, wherein the output shaft is positioned to a side of the crankshaft that faces the cylinder head with respect to the reciprocating direction of the piston and is positioned so as to overlap with the cylinder or the cylinder head when viewed in the axial direction of the crankshaft, a gear housing space is defined by the gear casing cover and the one end portion of the cylinder in the axial direction of the crankshaft, and the transmission mechanism is arranged within the gear housing space.

2. The power unit as claimed in claim 1, wherein the output shaft is positioned to be situated within a dimension defined by the cylinder in a perpendicular direction that is a direction perpendicular to both the axial direction of the crankshaft and the reciprocating direction of the piston.

3. The power unit as claimed in claim 2, wherein the engine includes an air intake valve, an air intake valve operation control mechanism which operates the air intake valve, an exhaust valve, and an exhaust valve operation control mechanism which operates the exhaust valve, wherein the air intake valve operation control mechanism includes an air intake-side cam shaft and a cam provided on the air intake-side cam shaft to open and close the air intake valve, the exhaust valve operation control mechanism includes an exhaust-side cam shaft and a cam provided on the exhaust-side cam shaft to open and close the exhaust valve, and the output shaft defining an axis which is situated intermediate between an axis of the air intake-side cam shaft and an axis of the exhaust-side cam shaft in the perpendicular direction.

4. The power unit as claimed in claim 3 wherein at least a portion of the output shaft is situated centrally within the dimension defined by the cylinder in the perpendicular direction.

5. The power unit as claimed in claim 1, wherein the transmission mechanism transfers power from the engine to the output shaft with a changed speed.

6. The power unit as claimed in claim 5, wherein the transmission mechanism comprises a speed reducer which reduces a speed of power from the engine.

7. The power unit as claimed in claim 1, wherein the transmission mechanism includes: a power transmission rotational member which rotates in an interlocking manner with the crankshaft; and a casing fixed to the cylinder and enclosing the power transmission rotational member, and the output shaft partially forming the power transmission rotational member.

8. The power unit as claimed in claim 7, further comprising:

casing-side bearing rotatably supporting the power transmission rotational member on the casing; and cylinder-side bearings rotatably supporting the power transmission rotational member on the cylinder.

9. The power unit as claimed in claim 8, wherein the casing includes a rib formed thereon, which reinforces the casing.

10. The power unit as claimed in claim 9, wherein the rib extends in a radial direction of the power transmission rotational member and comprises a plurality of ribs spaced apart in a circumferential direction of the power transmission rotational member.

11. The power unit as claimed in claim 7, wherein the cylinder includes a casing mount to which the casing is coupled, and a portion of the casing mount protrudes towards the cylinder head in the reciprocating direction of the piston beyond a mating interface between the cylinder and the cylinder head.

12. The power unit as claimed in claim 1, wherein the output shaft coaxially couples to a rotary element.

13. A propeller aircraft comprising the power unit as claimed in claim 12, wherein the power unit is disposed in an airframe of the propeller aircraft, the crankshaft is disposed along with a propeller shaft in a direction aligned with a centerline, in a widthwise direction of a fuselage, of the propeller aircraft, and the power unit is disposed such that the reciprocating direction for the piston is aligned with a vertical direction and an axis defined by the cylinder is located on the centerline, in the widthwise direction of the fuselage, of the propeller aircraft, when wings of the propeller aircraft are positioned horizontally.

14. The power unit as claimed in claim 1, wherein the output shaft is supported by the cylinder through a bearing.

15. The power unit as claimed in claim 1, wherein the transmission mechanism includes an input-side gear provided on the crankshaft, and the crankshaft is supported by the gear casing cover through a first bearing at one end portion thereof in the axial direction of the crankshaft.

16. The power unit as claimed in claim 1, wherein the transmission mechanism includes an input-side gear provided on the crankshaft, the crankshaft is supported by the gear casing cover through a first bearing at one end portion thereof in the axial direction of the crankshaft, and the output shaft is supported by the cylinder through a second bearing.

\* \* \* \* \*